Sept. 28, 1943.  A. E. LAZZELL  2,330,435
WEDGE-PLATE BELT SPLICE
Filed April 10, 1942

INVENTOR.
ARCHIE E. LAZZELL,
BY: Hood & Hahn
ATTORNEYS

Patented Sept. 28, 1943

2,330,435

UNITED STATES PATENT OFFICE 2,330,435

WEDGE-PLATE BELT SPLICE

Archie E. Lazzell, Columbus, Ind., assignor to Reeves Pulley Company, Columbus, Ind., a corporation of Indiana Application April 10, 1942, Serial No. 438,386

9 Claims. (Cl. 24—37)

The present invention relates to a belt splice, and has for its primary object the provision of an extremely inexpensive, simple, but highly effective means for securing together the ends of a belt body or band. While the invention finds its major usefulness, and is illustrated, in connection with a belt of the type comprising a body to which are secured laterally rigid, transversely extending spacer blocks, the invention is not limited to that application.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 1:
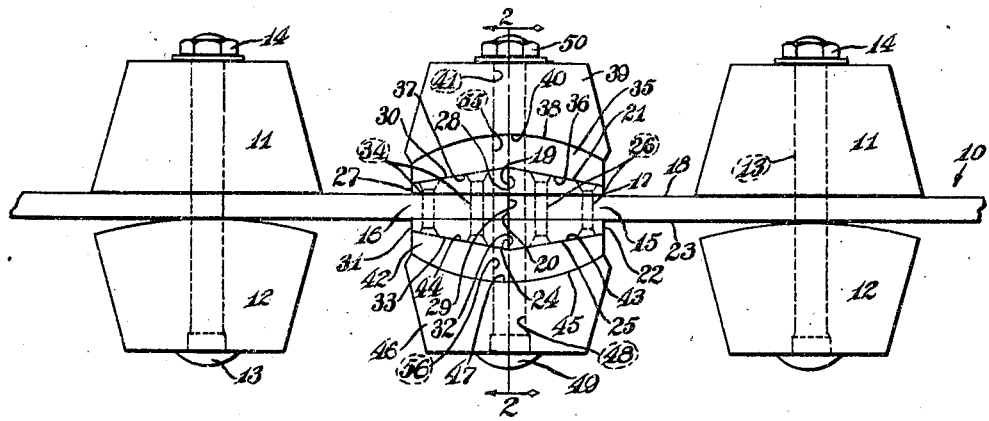
Fig. 1 is a side elevation of a fragment of a belt the ends of which are secured together through the medium of my novel splice.

Referring more particularly to the drawing, it will be seen that I have illustrated a belt comprising a band or body indicated generally by the reference numeral 10, with which there is associated an outer series of transversely rigid blocks 11 and an inner series of transversely rigid blocks 12, each pair of blocks 11 and 12 being secured together and to the band 10 by means of one or more bolts 13 passing therethrough, with nuts 14 threaded onto the ends of the bolts to clamp the block pair together upon the belt body.

The two ends of the belt body 15 and 16 are secured together through the medium of the novel splice now to be described.

Figures 2, 3:
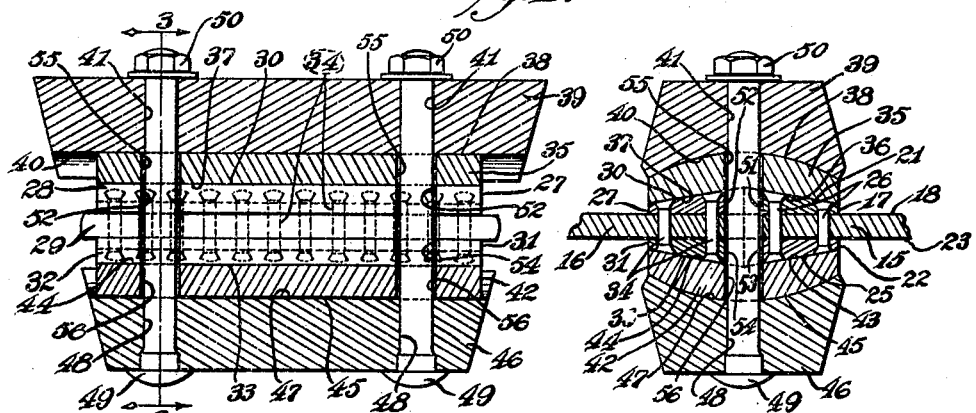
Fig. 2 is a transverse section taken substantially on the line 2—2 of Fig. 1 and looking in the direction of the arrows.
Fig. 3 is a longitudinal section taken substantially on the line 3—3 of Fig. 2 and looking in the direction of the arrows.
Figure 4:
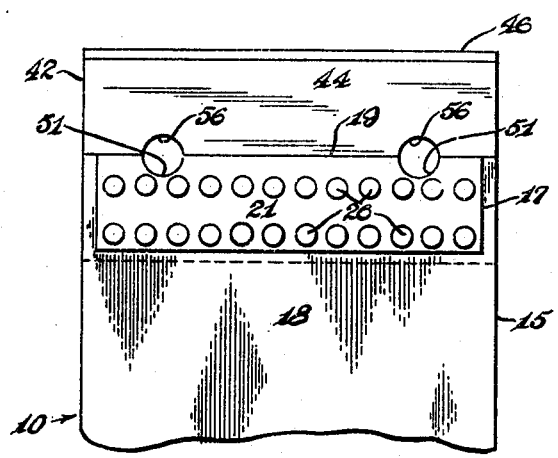
Fig. 4 is a plan view of one end of the belt, parts of the splice having been removed therefrom for clarity of illustration.

A metal plate 17, having a transverse dimension substantially equal to the corresponding dimension of the belt end 15, is secured to the outer surface 18 thereof. That edge 19 of the plate 17 adjacent the extremity 20 of the belt end 15 is preferably coplanar with said extremity 20, and is considerably thicker than the edge of said plate remote from said belt end extremity. Preferably, the outer surface 21 of the plate 17 slopes uniformly from the edge 19 toward the opposite edge of said plate 17. A similar plate 22 is secured to the inner surface 23 of the belt end, its edge 24 being preferably coplanar with the extremity 20 of the belt end 15 and with the edge 19 of the plate 17; and the surface 25 of the plate 22 slopes preferably uniformly from the edge 24 toward the edge of the plate 22 remote from the belt extremity 20. Preferably, but not necessarily, the surfaces 21 and 25 are equally and oppositely angularly related to a plane lying midway between the outer and inner surfaces 18 and 23 of the belt end 15. Essentially, the surfaces 21 and 25 approach that plane as they retreat from the belt extremity 20. Rivets 26 pass through the plates 22 and 17 and have their heads countersunk in the surfaces 25 and 21, as is clearly illustrated in Figs. 1 and 3.

A plate 27 is secured to the outer surface of the belt end 16, its edge 28 being located in the plane of the extremity 29 of said belt end 16, and its outer surface 30 sloping toward the plane intermediate the surfaces of the belt end 16 as it retreats from the edge 28. A cooperating plate 31 is secured to the inner surface of the belt end 16, its edge 32 lying in the plane of the extremity 29 of said belt end, and its surface 33 likewise sloping uniformly toward said intermediate plane as it retreats from the edge 32. Rivets 34 pass through the plates 27 and 31 to secure said plates to the belt end 16, their heads being countersunk in the surfaces 30 and 33.

A metal plate 35 straddles the plates 17 and 27, said plate being formed with angularly related surfaces 36 and 37 conforming to, and engaging, the surfaces 21 and 30 of said plates 17 and 27. The surface 38 of said plate 35 remote from the belt body is, in the preferred form of the invention, part cylindrical as shown; but this feature of construction is not essential to the invention. A non-metallic block 39 overlies the plate 35, being formed with a surface 40 shaped to conform to the surface 38 of said plate 35. The block 39 is formed with one or more bores 41, while the plate 35 is formed with a corresponding number of apertures 55 and the plates 17 and 27 are formed with notches 51 and 52, for a reason later to become apparent.

A plate 42 similar to the plate 35 straddles the wedge plates 22 and 31, said plate 42 being formed to provide angularly related surfaces 43 and 44 conforming to and engaging the surfaces 25 and 33 of the plates 22 and 31. The outer surface of said plate 42, in the illustrated embodiment of the invention, is part cylindrical, as indicated at 45; but this feature is not essential to the invention. A non-metallic block 46 overlies the plate 42, and is formed to provide a surface 47 conforming to the surface 45 of the block 42. One or more bores 48 penetrate the block 46 to register with a corresponding number of apertures 55 in the plate 42 and with notches 53 and 54 in the thicker edges of the plates 22 and 31. It will be seen that the bores 41 and 48, the apertures 55 and 56, and the notches 51, 52, 53, and 54 all are brought into registry when the splice is assembled, for the passage of bolts 49 adapted to receive nuts 50 on their projecting ends, whereby the assembly is clamped together. The bolts 49 and nuts 50 act directly upon the blocks 39 and 46, urging said blocks toward each other to hold the plates 35 and 42 against separation; whereby the surfaces 36 and 37 and the surfaces 43 and 44 cooperate with the surfaces 21, 30, 25, and 33 of the respective wedge plates 17, 27, 22, and 31 positively to prevent separation of the ends 15 and 16 of the belt body 10.

I claim as my invention:

1. The combination with a belt body of means for securing together the ends of said body comprising a plate secured to each surface of each end of said body and extending transversely thereof, the thickness of each of said plates adjacent the extremity of its associated belt end being greater than its thickness remote from such extremity, an element engaging both plates on one surface of said body and conforming to their surface contours, an element engaging both plates on the other surface of said body and conforming to their surface contours, and means securing said last-named elements in place with respect to said plates.

2. The combination with a belt body of means for securing together the ends of said body comprising a plate secured to each end of said body and extending transversely thereof, the thickness of each of said plates tapering from its edge adjacent the extremity of its associated belt end toward its edge remote from said extremity, an element engaging both of said plates and conforming to their surface contours, and means engaging said last-named means and operative to clamp the same releasably in place with respect to said plates.

3. The combination with a belt body of means for securing together the ends of said body comprising a plate secured to one surface of one end of said body and extending transversely thereof, a second plate secured to the same surface of the other end of said body and extending transversely thereof, the thickness of each of said plates tapering from its edge adjacent the extremity of its associated belt end toward its edge remote from said extremity, an element engaging both of said plates and conforming to their surface contours, a separate element cooperatively associated with the opposite surface of said belt, and separable clamping means cooperating with said elements to hold said first-named element removably in securing engagement with said plates.

4. The combination with a belt body of means for securing together the ends of said body comprising means producing a progressive increase in the effective thickness of said belt adjacent each end thereof, means engaging the portions of increasing thickness with a wedging action, and separable means clamping said last-named means in place to prevent separation of said belt ends.

5. The combination with a belt body of means for securing together the ends of said body comprising a pair of wedge plates secured to one end of said belt, said plates being associated respectively with the two surfaces of said belt end and each extending transversely of said belt end and diminishing in thickness from its edge adjacent the extremity of said belt end toward its edge remote from said extremity, a second pair of wedge plates secured to the other end of said belt, said second pair of plates being associated respectively with the two surfaces of said other belt end and each extending transversely of said other belt end and diminishing in thickness from its edge adjacent the extremity of said other belt end toward its edge remote from said extremity, means engaging the two plates secured to one surface of said belt, means engaging the two plates secured to the other surface of said belt, and clamping means engaging both of said last-named means to hold the same in co-operative relation with their associated plates.

6. The combination with a belt body of means for securing together the ends of said body comprising a pair of wedge plates secured to one end of said belt, said plates being associated respectively with the two surfaces of said belt end and each extending transversely of said belt end and diminishing in thickness from its edge adjacent the extremity of said belt end toward its edge remote from said extremity, a second pair of wedge plates secured to the other end of said belt, said second pair of plates being associated respectively with the two surfaces of said other belt end and each extending transversely of said other belt end and diminishing in thickness from its edge adjacent the extremity of said other belt end toward its edge remote from said extremity, means provided with angularly related surfaces conforming to and engaging the inclined surfaces of the two plates secured to one surface of said belt, means provided with angularly related surfaces conforming to and engaging the inclined surfaces of the two plates secured to the other surface of said belt, and clamping means engaging both of said last-named means to hold the same in cooperative relation with their associated plates.

7. The combination with a belt body of means for securing together the ends of said body comprising a pair of metal wedge plates secured to one end of said belt, said plates being associated respectively with the two surfaces of said belt end and each extending transversely of said belt end and diminishing in thickness from its edge adjacent the extremity of said belt end toward its edge remote from said extremity, a second pair of metal wedge plates secured to the other end of said belt, said second pair of plates being associated respectively with the two surfaces of said other belt end and each extending transversely of said other belt end and diminishing in thickness from its edge adjacent the extremity of said other belt end toward its edge remote from said extremity, metal means engaging the two plates secured to one surface of said belt, metal means engaging the two plates secured to the other surface of said belt, and clamping means engaging both of said last-named means to hold the same in cooperative relation with their associated plates.

8. The combination with a belt body of means for securing together the ends of said body comprising a pair of metal wedge plates secured to one end of said belt, said plates being associated respectively with the two surfaces of said belt end and each extending transversely of said belt end and diminishing in thickness from its edge adjacent the extremity of said belt end toward its edge remote from said extremity, a second pair of metal wedge plates secured to the other end of said belt, said second pair of plates being associated respectively with the two surfaces of said other belt end and each extending transversely of said other belt end and diminishing in thickness from its edge adjacent the extremity of said other belt end toward its edge remote from said extremity, metal means engaging the two plates secured to one surface of said belt, metal means engaging the two plates secured to the other surface of said belt, a non-metallic block overlying said first-named metal means, a non-metallic block overlying said last-named metal means, and clamping means engaging said blocks to maintain the above-recited elements in assembled relation.

9. The combination with a belt body of means for securing together the ends of said body comprising a pair of metal wedge plates secured to one end of said belt, said plates being associated respectively with the two surfaces of said belt end and each extending transversely of said belt end and diminishing in thickness from its edge adjacent the extremity of said belt end toward its edge remote from said extremity, a second pair of metal wedge plates secured to the other end of said belt, said second pair of plates being associated respectively with the two surfaces of said other belt end and each extending transversely of said other belt end and diminishing in thickness from its edge adjacent the extremity of said other belt end toward its edge remote from said extremity, metal means engaging the two plates secured to one surface of said belt, metal means engaging the two plates secured to the other surface of said belt, a non-metallic block overlying said first-named metal means, a non-metallic block overlying said last-named metal means, a plurality of bolts passing through said blocks and said metal means, and means cooperating with said bolts to hold the elements of the splice in assembled relation.

ARCHIE E. LAZZELL.